March 13, 1928.
C. L. BASTIAN
VALVE
Filed Sept. 7, 1926
1,662,291
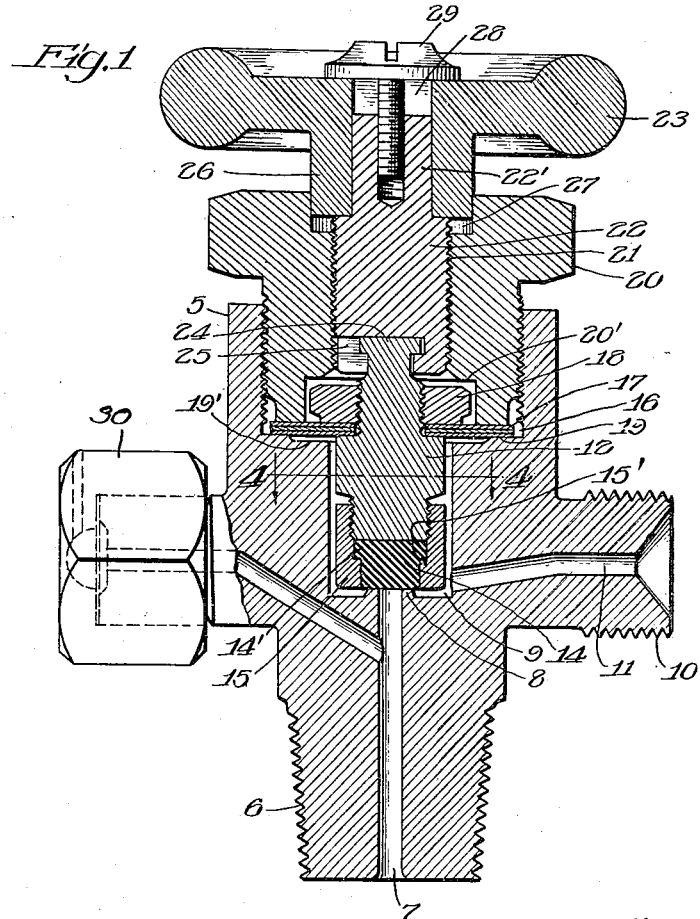
Inventor:
Charles L. Bastian
By Wm. O. Belt atty Patented Mar. 13, 1928.

1,662,291

UNITED STATES PATENT OFFICE.

CHARLES L. BASTIAN, OF CHICAGO, ILLINOIS, ASSIGNOR TO THE BASTIAN-BLESSING COMPANY, OF CHICAGO, ILLINOIS, A CORPORATION OF ILLINOIS.

VALVE.

Application filed September 7, 1926. Serial No. 133,795.

This invention relates to valves of the kind which are used on the supply tanks or cylinders for high pressure gas, and its object is to provide a novel and efficient valve for this purpose which will prevent leakage of the gas from the tank.

Another object of the invention is to protect the diaphragm of the valve against damage by providing fixed stops which limit the movements for opening and closing the valve.

And a further object is to provide a novel and improved valve of substantial construction, which is opened and closed by direct manual adjustment, which operates in fixed limits and in definite guides, and which is free from packing, springs and other similar parts which sometimes are or become unreliable and inefficient in use.

In the accompanying drawings illustrating a selected embodiment of the invention:

Fig. 1 is a sectional view of the complete valve.

Fig. 2 is a detail perspective view of the hand wheel screw stem.

Fig. 3 is a detail perspective view of the valve member and diaphragm.

Fig. 4 is a detail section on the line 4—4 of Fig. 1.

Referring to the drawings the valve body 5 has a threaded end 6 adapted to be screwed into the gas supply tank and it is provided with a gas passage 7 extending through the seat 8 and communicating with the valve chamber 9. A threaded nipple 10 is adapted to be connected with means for charging or discharging the tank and this nipple is provided with a passage 11 which communicates with the valve chamber 9 preferably adjacent to the bottom thereof to provide as nearly as possible an unobstructed and uninterrupted communication with the tank. A valve member 12 is arranged in the valve chamber 9 and it has reduced and threaded ends and a hexagon shaped intermediate part whose edges 13 (Fig. 4) engage the wall of the chamber 9 and form a positive guide for the valve member to prevent it from tilting and to retain it in proper position. A valve disk 14 is secured by a threaded collar 15 to the lower end of the valve member 12 and it is provided with a shoulder 14' to be engaged by a shoulder 15' on the collar whereby the disk is securely held within the collar and against the end of the valve member. The disk engages the valve seat 8, which projects slightly above the bottom wall of the valve chamber, and the diameter of the contact face of the disk is greater than the diameter of the contact face of the seat.

The body of the valve is recessed at its upper end to provide a chamber 16 for the diaphragm 17 which is secured on the upper reduced end of the valve member 12 by a nut 18 and is clamped at its margin against a shoulder 19 at the bottom of the recess by a plug 20 screw threaded in the recess. The plug has a threaded opening 21 to receive the threaded stem 22 of a hand wheel 23. The lower end of the stem is slidably engaged with the upper end of the valve member 12 by a head 24 on the valve member which engages a slot 25 in the stem whereby the two parts may move conjointly in a longitudinal direction and the stem may be moved rotatively with the hand wheel relative to the valve member. Thus the hand wheel may be operated to directly move the disk 14 away from or against the seat 8 to open or close the valve, without moving the disk or the valve member 12 rotatively. The boss 26 of the hand wheel is guided in a recess 27 in the plug 20 and the upper end 22' of the stem 22 is rectangular in shape and is rigidly secured in an opening 28 in the hand wheel by a screw 29.

The valve is free from packing, springs and other delicate and unsubstantial parts which may be initially inefficient or become so while the valve is in use and render it ineffective. The valve is opened and closed by direct engagement of the hand wheel stem with the valve member, the opening and closing movement of the valve being complementary to the outward and inward movement of the hand wheel and in no respect dependent upon the diaphragm. The diaphragm is clamped on the valve member by the nut 18 and against the shoulder 19 by the plug 20 to form a flexible joint which is gas tight and prevents the escape of gas at the top of the valve. The function of the diaphragm is solely to provide a gas tight closure for the valve chamber 9 at its upper end, and to avoid the use of packing.

These valves must hold a pressure of two thousand pounds in full tanks and they are often subjected to rough usage in handling and while being transported. Operators usually try to screw the operating wheel down as tightly as they can, in an effort to prevent leakage, and this has often resulted in serious damage to a valve, as heretofore constructed, and has caused the diaphragm to take a set which renders it practically useless. This defect may not be apparent at the time, but leakage occurs and the tank may be delivered to a customer and later found to be empty of gas. This is annoying to the customer and costly to the manufacturer or dealer. I provide a positive fixed guide for the valve member which insures that the valve disk will engage the seat squarely at all times, and I provide stops for limiting the closing and opening movements of the valve member so that it will be impossible to damage the valve by operating the hand wheel. I have stated that the valve seat projects slightly above the bottom wall of the valve chamber and is otherwise constructed so that it will embed in the disk. This embedment will progress as the valve is used until the collar 15 which forms part of the valve member engages the bottom of the chamber 9 and the diaphragm engages the shoulder stop 19'. Thus the valve member is limited in movement by the bottom wall of the chamber, which forms a fixed bottom stop, and by the shoulder stop 19' which is engaged by the diaphragm. When the disk becomes worn by the seat so that it cannot be tightened sufficiently it permits leakage. This will be a signal that the disk needs replacement, and when it is replaced the valve will again be in efficient working condition.

The bottom of the valve chamber constitutes a positive and effective stop to limit the inward movement of the valve member and the parts are so proportioned that when the collar engages the bottom of the valve chamber the diaphragm will engage the shoulder 19'. If for any reason the inward movement of the valve member is possible after the diaphragm has engaged the shoulder 19', such further movement will result in the edge of the shoulder cutting the diaphragm and releasing the pressure; but this could only happen in the case of defective construction, or improper assembly or adjustment of parts. The nut 18 will engage the shoulder 20' on the plug and limit the opening movement of the valve, forming a positive stop therefor, thus the diaphragm is protected against damage through excessive movement of the hand wheel in either direction by positive stops for the valve member.

I provide the valve with suitable safety means, indicated generally at 30, to permit the gas to escape in event a predetermined pressure is exceeded. The safety means disclosed in my companion application Serial No. 133,796 filed concurrently herewith and now become Patent No. 1,649,210 may be used.

Changes in the form, construction and arrangement of parts of my invention may be made without departing from the spirit or sacrificing the advantages thereof and I reserve the right to make all such changes as fall within the scope of the following claims.

I claim:

1. A valve comprising a body having a valve chamber therein, an inlet passage to said chamber and an outlet passage from said chamber, a seat in said chamber around the inlet passage, a valve member having a reduced upper end in the valve chamber, a threaded collar on said valve, a valve disk carried by said threaded collar and movable therewith to engage said seat, said seat being raised above the valve chamber wall around the inlet opening and said disk being larger than the seat so that the seat may be embed in the disk, a diaphragm forming a gas tight closure for the upper end of the valve chamber, a nut on the reduced end of said valve for clamping the diaphragm to the valve member, and means for moving said valve member to open and to close the valve.

2. A valve comprising a body having a valve chamber therein, an inlet passage to said chamber and an outlet passage from said chamber, a seat in said chamber around the inlet passage, a valve member, a collar on said valve member, a disk carried by said collar to engage said seat, a diaphragm clamped to the valve member and forming a gas tight closure for the upper end of the valve chamber, and manually operated means connected directly to the valve member for moving said valve member to open and to close the valve.

3. A valve comprising a body having a valve chamber therein, an inlet passage to said chamber and an outlet passage from said chamber, a seat in said chamber around the inlet passage, a valve member, a collar on said member a disk carried by said collar to engage said seat, a diaphragm connected to the valve member and forming a gas tight closure for the upper end of the valve chamber, and means including the collar to provide a positive stop for limiting the movement of the valve member and disk towards the valve seat.

4. A valve comprising a body having a valve chamber therein, an inlet passage to said chamber and an outlet passage from said chamber, a seat in said chamber around the inlet passage, a valve member having a reduced upper end, a disk carried by said member to engage said seat, a diaphragm, a nut on the reduced end of the valve member and engaging the diaphragm to form a gas tight closure for the upper end of the valve chamber, and means including the nut to provide a positive stop for limiting the movement of the valve member and disk away from the valve seat.

5. A valve comprising a body having a valve chamber therein, an inlet passage to said chamber and an outlet passage from said chamber, a seat in said chamber around the inlet passage, a valve member having a reduced upper end, a collar threadedly engaging said member a disk carried by said collar to engage said seat, a diaphragm, a nut on the reduced end of the valve member and engaging the diaphragm to form a gas tight closure for the upper end of the valve chamber, and positive stops including the nut and collar for limiting the opening and closing movements of the valve member to prevent damage to the diaphragm.

6. A valve comprising a body having a valve chamber therein, an inlet passage to said chamber and an outlet passage from said chamber, a raised seat in said chamber around the inlet passage, a valve member, a disk, a collar screw threaded on the valve member and securing the disk thereto, a diaphragm connected to the valve member and forming a gas tight closure for the upper end of the valve chamber, positive stops threadedly engaging the valve member for limiting the opening and closing movements of said valve member, and manually operated means connected directly to the valve chamber for moving said valve member to open and to close the valve.

7. A valve comprising a body having a valve chamber therein, an inlet passage to said chamber and an outlet passage from said chamber, a seat in said chamber around the inlet passage, a valve member having a hexagonal intermediate part to engage the walls of the chamber, a disk carried by said member to engage said seat, a diaphragm secured rigidly and gas tight on said valve member, a plug engaging the margin of said diaphragm to clamp the diaphragm to the body to form a gas tight closure for the upper end of the valve chamber, a hand wheel recessed in said plug, a stem for the hand wheel screw threaded in the plug and extending above the recessed part of the plug, and a detachable connection between the valve member and the stem.

8. A valve comprising a body having a valve chamber therein, an inlet passage to said chamber and an outlet passage from said chamber, a seat in said chamber around the inlet passage, a valve member having a hexagonal intermediate part to engage the walls of the chamber, a collar on said member, a disk carried by said collar to engage said seat, a nut, a diaphragm secured gas tight on said valve member by said nut, a plug engaging the margin of said diaphragm and surrounding the nut to clamp the diaphragm to the body to form a gas tight closure for the upper end of the valve chamber, a hand wheel having its lower end recessed in said plug, a stem for the hand wheel screw threaded in the plug, and a flange and slot connection between the valve member and the stem whereby the hand wheel and stem may move rotatively relative to the valve member to move the valve member longitudinally to and from said seat.

CHARLES L. BASTIAN.